United States Patent [19]
Kurz

[11] Patent Number: 4,852,105
[45] Date of Patent: Jul. 25, 1989

[54] SYSTEM FOR EVALUATION OF A SUBCODE

[75] Inventor: Arthur Kurz, Marbach, Fed. Rep. of Germany

[73] Assignee: Deutsche Thompson-Brandt GmbH, Villingen-Schwenningen, Fed. Rep. of Germany

[21] Appl. No.: 742,619

[22] Filed: Jun. 7, 1985

[30] Foreign Application Priority Data

Oct. 8, 1983 [DE] Fed. Rep. of Germany ....... 3336747

[51] Int. Cl.⁴ ............................................. G06F 11/08
[52] U.S. Cl. ...................................................... 371/69
[58] Field of Search ............... 371/13, 36, 69; 360/18, 360/38.1, 47, 53; 369/70, 59, 32

[56] References Cited

U.S. PATENT DOCUMENTS

| | | | |
|---|---|---|---|
| 4,093,825 | 6/1978 | Gladstone et al. | 371/69 X |
| 4,375,101 | 2/1983 | Cerracchio | 371/69 |
| 4,518,947 | 5/1985 | Poston et al. | 371/69 X |
| 4,541,095 | 9/1985 | Vries | 371/69 |
| 4,577,332 | 3/1986 | Brenig | 371/69 X |
| 4,613,965 | 9/1986 | Hori et al. | 369/59 |

FOREIGN PATENT DOCUMENTS

| | | |
|---|---|---|
| 0048779 | 4/1982 | European Pat. Off. . |
| 0074841 | 3/1983 | European Pat. Off. . |
| 2101356A | 1/1983 | United Kingdom . |

OTHER PUBLICATIONS

BKSTS Journ., Jul. 83, vol. 65, Iss. 7, C. Margadant, "Interfacing A-V Equipment to Compact I", pp. 384-388.
Electronic Components & Applications, vol. 4, No. 3, May 1982, J. Matull, pp. 131-141, "ICs for Compact Disc Decoders".

Primary Examiner—Gary V. Harkcom
Attorney, Agent, or Firm—Horst M. Kasper

[57] ABSTRACT

A system is provided for evaluating a subcode of a digital information transmission. Such transmission occurs in particular in the context of scanning of compact disc recordings. Data blocks of a digital signal including a subcode of several segments and associated with a large redundancy are present as an additional signal, and these data blocks are separately evaluated with respect to each segment of the subcode corresponding to a data block. The digital signals are preferably audio or video signals. It is possible to intermediately store the data of each segment and to continuously compare the data of each segment of a preceding intermediately stored data segment. The preceding intermediately stored data segment can be the immediate sequential predecessor of the data segment under consideration. The segments of a data block can be evaluated successively according to a time multiplexing method.

19 Claims, 2 Drawing Sheets

SYSTEM FOR EVALUATION OF A SUBCODE

CROSS-REFERENCE TO RELATED APPLICATIONS

This application is a continuation-in-part application of another application filed Sept. 28, 1984 and bearing application Ser. No. PCT/EP84/00296. This claim is made under Section 35 U.S.C. 365 (c), under Section 35 U.S.C. 371 and under any other Section of the U.S.C. supporting such claim.

BACKGROUND OF THE INVENTION

1. Field of the Invention

The invention relates to a system for the evaluation of a subcode of a digital information transmission, where the subcode is associated with a large redundancy and comprises several segments, which system is adapted in particular for the evaluation of a subcode in the case of compact disc recordings.

2. Brief Description of the Background of the Invention Including Prior Art

In the case of storage of signals such as, for example, audio signals in a compact disc technique, the so-called subcode channels are recorded at the same time the recording itself takes place. Such subcodes serve for the storage of data which are associated with the main storage data in reasonable connection, for example if the recorded data represent a music program. The subcode can be information which is not intended to be part of the direct proper audio transmission. For example, the so-called Q-channel of a subcode serves for operating and displaying the status and the operation of a compact disc apparatus.

The subcode channels are subdivided into individual so-called blocks, and these blocks are subdivided into segments. In general, a block is a set of locations or tape positions in which a block of words is stored. A segment is in general a portion of a line or of a curve disposed between two points. For example, these points can be points on a compact disc or abstract points. For example, the subcode channel O can comprise 96 bits plus two synchronization bits and comprise information relating to the title, the number, the running time of the piece of music in minutes and seconds, or it can provide information about the contents of an audio record disc. The information bits of a subcode segment can be embedded in the data bits of the audio program in a convoluted way. In order to maintain a sufficiently large redundancy, 75 subcode blocks can be scanned in each second. In this way, a continuous flow of information about the subcode data is possible during the reproduction of a music program. In order to maintain a testing of the code, 16 parity bits can be joined to the 80 data bits of one block in order to be able to detect errors on the reproduction side of the information. Errors can be recognized with the aid of cyclic redundancy checks for example. The parity bits are so joined to the data bits that with the aid of the CRC (cyclic redundancy check), that is, after a division of the contents of the block by a predetermined generator polynominal G(x), there has to result a quotient without a remainder. If the division results in a remainder, then a bit error is present in the data word. It can be easily recognized that in the case of a plurality of bits and in the present case of 96 bits, there frequently arise bit errors such that the read-out information is declared by the evaluation logic as without value and is rejected. A localization of the bit error is not possible. One can easily imagine that a sequence of bit errors is present, for example, in the way of "drop outs" on digital sound recordings. In addition, defective settings at the reproduction apparatus can cause bit errors. Furthermore, bit errors can occur again and again in the subcode region of the Q-channel. This results in a noisy display of the selected information, such as for example, the program title and program number, the running time and so on. However, in the case of the reproduction of a music program, not all information is continuously required. In the evaluation of the accumulated time for example, the other segments of the data block are of no interest. Since, however, bit errors are present in these segments, the cyclic redundancy check testing method recognizes an error of the complete block such that no information is available because the cyclic redundancy check method does not permit a subdivision of the testing within a block. Therefore, with this method, an interference free evaluation is not always possible. In addition, the cyclic redundancy check testing method entails substantial calculating requirements since the operation of dividing by the generator polynominal has to be performed continuously.

SUMMARY OF THE INVENTION

1. Purposes of the Invention

It is an object of the present invention to provide a simplified testing method and to eliminate error possibilities in the reading of subcodes.

It is a further object of the present invention to provide a storage logic adapted to detect errors in read subcode blocks and to eliminate deficient information.

It is yet another object of the present invention to provide an apparatus and circuit which is adapted to process subcode signals and to furnish substantially error free subcode information.

These and other objects and advantages of the present invention will become evident from the description which follows.

2. Brief Description of the Invention

The present invention provides a method for evaluation of a subcode of a digital information transmission by providing as an additional signal data blocks of a digital signal which include a subcode of several segments and are associated with a large redundancy and by evaluating separately each segment of the subcode corresponding to a data block.

The digital signal can include an audio signal. It can include a video signal. The digital signal can be produced by reading a compact disc.

The method for evaluation of a subcode of a digital information transmission can further comprise intermediately storing the data of each segment and continuously comparing the data of each segment with the data of a preceding intermediately stored data segment. The preceding intermediately stored data segment can be the immediate sequential predecessor of the present data segment.

The segments of a data block can be evaluated successively according to a time multiplexing method.

The data of a selected segment of a subcode block can be fed to the scanner of a single period counter for counting the number of read in segments. The data of the selected segment can be stored in a first register and fed to the scanner. The data stored in a first register can be compared with the data of the successive segment and a flag can be set according to the result of the comparing step.

The data of the successive segment can be stored in a second register if the contents of the stored segment and of the successive segment are different, and a flag can be set corresponding to the incongruence of the two segments.

The data of a third successive segment of a subcode block can be fed to the scanner. The data stored in the second register can be compared with the data of the third successive segment, and a flag can be set according to the result of the comparing step.

The data stored in the first register can be compared with the data of the third successive segment in case the data of the third successive segment are not congruent with the contents of the second register. The contents of the third successive segment can be shifted into the first register in case the data of the third successive segment are not congruent with the contents of the first register, and a flag can be set according to the result of the comparing step.

Another aspect of the present invention provides an apparatus for evaluation of a subcode of a digital information transmission. In this apparatus, a data reader is connected to a first register, to a second register and to a third register. A control circuit is connected to the first register, to the second register and to the third register. A first gate is connected to the control circuit and to the first register and to the second register. A second gate is connected to the control circuit and to the third register and to the first gate. A first comparison stage is connected to an output of the first register and to an output of the second register, and a second comparison stage is connected to an output of the first register and to an output of the third register. A first error detection stage is connected to an output of the first comparison stage and to the control circuit, and a second error detection stage is connected to an output of the second comparison stage and to the control circuit. An AND-gate is connected to an output of the first error detection stage and to an output of the second error detection stage, and a switch element is connected to the first register and to an output of the AND-gate.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention.

DESCRIPTION OF INVENTION AND PREFERRED EMBODIMENT

The present invention provides a method for evaluating a subcode associated with large redundancy and comprises several segments of digital information transmission. For the purposes of the present application, redundancy means added or repeated information which is employed to reduce an ambiguity or error in a transmission of information. As the signal to noise ratio decreases, redundancy may be employed to prevent an increase in transmission error. In particular, redundancy is considered the fraction of total information content of a message that can be eliminated without losing essential information. The redundancy in the present case can run in principle up to 100%. Preferably, the redundancy is between 50 and 100% and more preferably, between 80 and 100%. The data blocks can be recorded in particular on a compact disc as additional information parallel to an audio and/or video signal. The evaluation can be performed separately for each segment of a subcode data block.

Preferably the data of each segment are compared continuously with the preceding segment based on an intermediate storage of such segments. The segments of the data block can be evaluated successively according to a time multiplex method.

Figure 1:
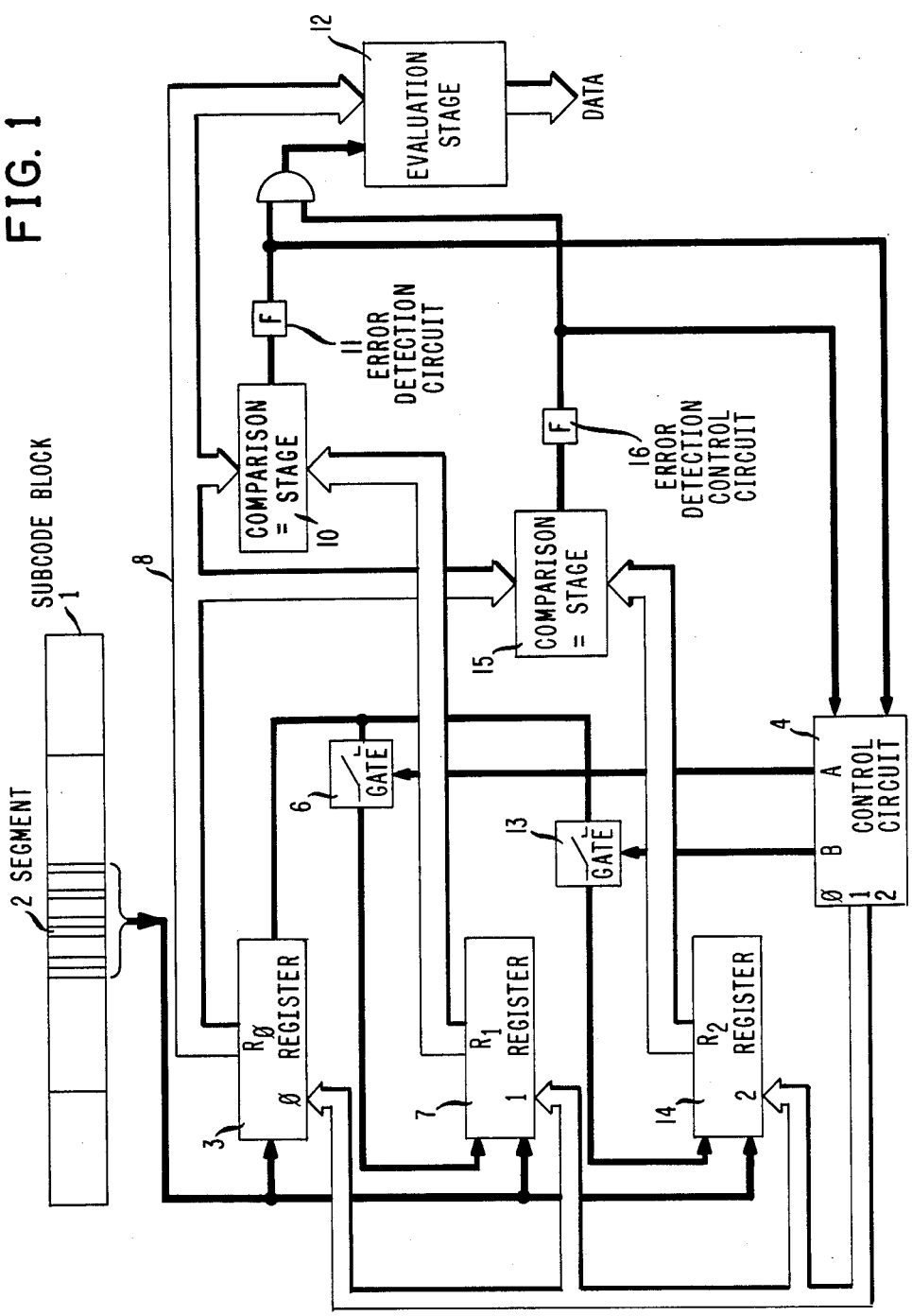
FIG. 1 shows a schematic view of a circuit for processing subcode signals.

Referring now to FIG. 1, there is shown a subcode block 1 in a schematic, of which the segment 2 to be evaluated and which is of interest, is taken out. The data bits of this selected subcode segment are read into a first register 3 ($R_0$). A control circuit 4 activates this register via a data line 5. The output A of the control circuit switches a gate 6 to conduct such that the data pass into the register 7 ($R_1$) activated via line 5. This is the first read in period.

Then new data are read into the first register 3 ($R_0$). This the second read in period.

The control circuit 4 carries the data stored in the two registers 3 ($R_0$) and 7 ($R_1$) via the data lines 8 and 9 to a comparison stage 10. In case of a positive result in the comparison stage 10, that is, in case of a congruence of the two segments, the error detection circuit 11 provides a signal to the stage 12, which allows the data of the register 3 to pass for evaluation. If the comparison is negative in the comparison stage 10, that is, the data of the two segments are different, then the error detection circuit 11 blocks the stage 12 and simultaneously provides a signal to the control circuit 4 according to which the control circuit 4 opens the gate 13 via the output B of the control circuit. Thereby, the data read into the first register 3 ($R_0$) are passed to the register 14 ($R_2$) activated via line 5 from the control circuit 4. The read in actual new data in the register 3 ($R_0$) are compared with the data last entered into the register 14 ($R_2$) in the comparison stage 15. In case the comparison is negative in the comparison stage 15, then a signal passes to the control circuit 4 via the error detection circuit 16.

Thereby, a comparison of the contents of the register 3 ($R_0$) from the third read in period is provided with the contents of the register 7 ($R_1$) from the first read in period. The comparison is provided via the comparison stage 10. In case of a positive result, the stage 12 is released for passing the data via the error detection circuit 11. In case of a negative result, the error detection circuit 11 generates a signal for the control circuit 4 which releases the register 7 ($R_1$) such that the actual present data of the third read in period from the register 3 ($R_0$) are entered via the open gate 6. The actual data of the third read in period are available for a successive comparison from the fourth read in period in the comparison stage 10.

In accordance with the described manner, all individual segments of a subcode block can be separately tested by providing a corresponding window for selecting of a certain segment.

The requirements described in FIG. 1 can be reduced by a corresponding and appropriate joining of the comparison stages 10 and 15 as well as of the error detection circuits 11 and 16 to in each case a single circuit controlled by the control circuit 4.

Figure 2:
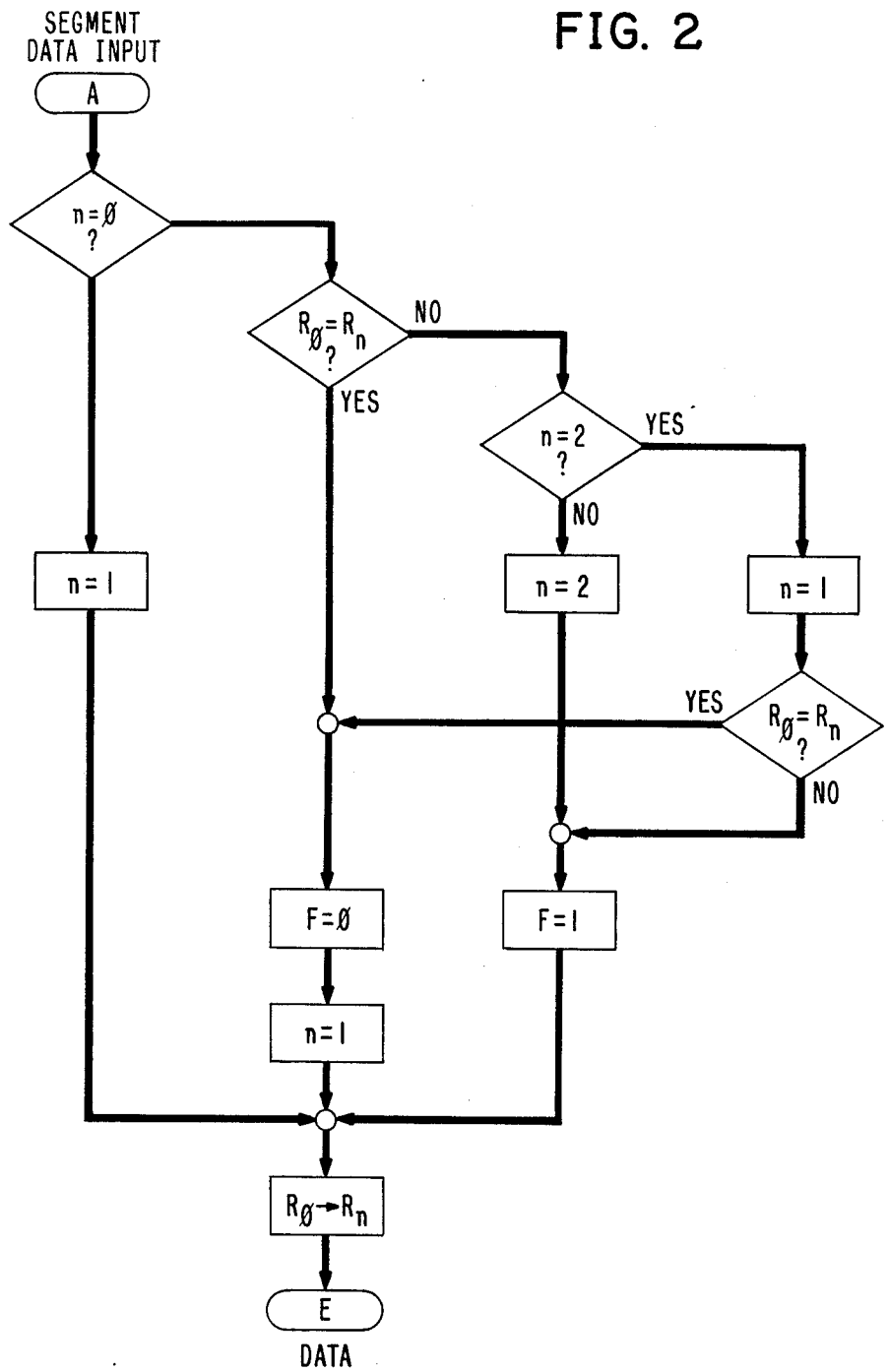
FIG. 2 is view of a flow diagram illustrating the processing of parts of a subcode.

FIG. 2 illustrates the above described method by the way of a flow diagram. The data to be tested from the selected segment of the subcode block pass via point A to a scanner of a scanning read in period counter which counts the number of the read in segments. After switching on of the apparatus, for example, a compact disc apparatus, the counter is at zero. Then the counter is set to $n=1$. The read in data are written over from the input register $R_0$ to the register $R_1$.

Now the first comparison is performed by comparing the contents of the second data input, which is now in the register $R_0$ with the data stored in the register $R_1$ from the first data read in period. In case of a positive result, the flag is set to zero, $F=0$, that is, the data in the register $R_1$ are valid and correct. The counter is then set to $n=1$, and the contents of the register $R_0$ is transferred to the register $R_1$.

In case the comparison is negative, then in a further stage the status of the counter is scanned for $n=2$?. Since up till then the counter was set to $n=1$, this is set to $n=2$ whereby the contents disposed in the register $R_0$ from the second read in period is transferred to the register $R_2$. The flag is set to 1 for indicating that the data are invalid, that is, they are wrong.

Now, the third data input passes via point A to the scanner $n=0$?. Since the counter is however set to $n=2$, the read in period of the register $R_0$ is compared with the contents of the register $R_2$ of the preceding read in period. In case of a positive result, the flag F is set equal to zero to indicate that the data are valid, that is, the data are correct. Then the counter is set to $n=1$ whereupon the data from the register $R_0$ are transferred to the register $R_1$ in order to be available for the next data input of the fourth read in period.

In case of a negative decision, the counter setting is scanned according to $n=2$? whereupon the counter is reset to $n=1$. The data present in $R_0$ from the third read in period are now compared with those in the register $R_1$. In the case of a positive result, the flag is again set $F=0$. In the case of a negative result however, the invalidity of the data is indicated with a setting of $F=1$, and the data from the third read in period from the register $R_0$ are shifted to the register $R_1$. Thus these data from the third read in period are available for the successive data comparison after the fourth read in period as a reference.

The method described in the context of FIG. 1 refers to a three way comparison of successively read in data of the segment. In the case of a lower requirement of accuracy, there can also be provided a two way comparison of data of two successively following segments, which reduces the requirements for performing the present method to some extent.

It will be understood that each of the elements described above, or two or more together, may also find a useful application in other types of systems for the evaluation of a subcode of an information comprising digital signals differing from the types described above.

While the invention has been illustrated and described as embodied in the context of a system for evaluation of a subcode of a digital information transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for evaluation of a subcode of a digital information transmission comprising providing data blocks of a digital signal including a subcode block of several segments and associated with a large redundancy as an additional signal;

evaluating separately each segment of the subcode corresponding to a data block;

feeding the data of a selected segment of a subcode block to the scanner of a single period counter, where the single period counter counts the number of read in segments;

storing the data of the selected segment in a first register;

feeding the data of a successive segment of a subcode block to the scanner;

comparing the data stored in a first register with the data of the successive segment;

setting a flag according to the result of the comparing step.

2. The method for evaluation of a subcode of a digital information transmission according to claim 1 wherein the digital signal includes an audio signal.

3. The method for evaluation of a subcode of a digital information transmission according to claim 1 wherein the digital signal includes a video signal.

4. The method for evaluation of a subcode of a digital information transmission according to claim 1 wherein the digital signal is produced by reading a compact disc.

5. The method for evaluation of a subcode of a digital information transmission according to claim 1 further comprising intermediately storing the data of each segment; and continuously comparing the data of each segment with the data of a preceding intermediately stored data segment.

6. The method for evaluation of a subcode of a digital information transmission according to claim 5 wherein the preceding intermediately stored data segment is the immediate sequential predecessor of the present data segment.

7. The method for evaluation of a subcode of a digital information transmission according to claim 1 further comprising time-multiplexing segments of a data block; and wherein the segments of a data block are evaluated successively.

8. The method for evaluation of a subcode of a digital information transmission according to claim 1 further comprising storing the data of the successive segment in a second register if the contents of the stored segment and of the successive segment are different;

setting a flag corresponding to an incongruence of the two segments.

9. The method for evaluation of a subcode of a digital information transmission according to claim 8 further comprising
feeding the data of a third successive segment of a subcode block to the scanner;
comparing the data stored in the second register with the data of the third successive segment;
setting a flag according to the result of the comparing step.

10. The method for evaluation of a subcode of a digital information transmission according to claim 8 further comprising
comparing the data stored in the first register with the data of the third successive segment in case the data of the third successive segment are not congruent with the contents of the second register;
shifting the contents of the third successive segment into the first register in case the data of the third successive segment are not congruent with the contents of the first register; and
setting a flag according to the result of the comparing step.

11. An apparatus for evaluation of a subcode of a digital information transmission comprising
a data reader;
a first register connected to the data reader;
a second register connected to the data reader;
a third register connected to the data reader;
a control circuit connected to the first register, to the second register and to the third register;
a first gate connected to the control circuit and to the first register and to the second register;
a second gate connected to the control circuit and to the third register and to the first gate;
a first comparison stage connected to an output of the first register and to an output of the second register;
a second comparison stage connected to an output of the first register and to an output of the third register;
a first error detection stage connected to an output of the first comparison stage and to the control circuit;
a second error detection stage connected to an output of the second comparison stage and to the control circuit;
an AND-gate connected to an output of the first error detection stage and to an output of the second error detection stage; and
a switch element connected to the first register and to an output of the AND-gate.

12. A method for evaluation of a subcode of a digital information transmission comprising
providing data blocks of a digital signal, wherein the digital signal is produced from a compact disk, and wherein the digital signal includes a subcode block of several segments and where the digital signal is associated with a large redundancy as an additional signal relative to a primary digital information transmission signal;
storing data of a selected segment in a first register;
storing the data of an immediately successive segment in a second register if the contents of the stored segment and of the successive segment are different;
setting a flag corresponding to an incongruence of the two segments; and
evaluating separately each segment of the subcode corresponding to a data block.

13. The method for evaluation of a subcode of a digital information transmission according to claim 12 wherein the digital signal includes an audio signal.

14. The method for evaluation of a subcode of a digital information transmission according to claim 12 wherein the digital signal includes a video signal.

15. The method for evaluation of a subcode of a digital information transmission according to claim 12 further comprising
intermediately storing the data of each segment; and
continuously comparing the data of each segment with the data of a preceding intermediately stored data segment.

16. The method for evaluation of a subcode of a digital information transmission according to claim 15 wherein the preceding intermediately stored data segment is the immediate sequential predecessor of the present data segment.

17. The method for evaluation of a subcode of a digital information transmission according to claim 12 further comprising
time-multiplexing segments of a data block; and
wherein the segments of a data block are evaluated successively.

18. The method for evaluation of a subcode of a digital information transmission according to claim 12 further comprising
feeding the data of a selected segment of a subcode block to the scanner of a single period counter, where the single period counter counts the number of read in segments;
feeding the data of a successive segment of a subcode block to the scanner;
comparing the data stored in a first register with the data of the successive segment;
setting a flag according to the result of the comparing step;
feeding the data of a third successive segment of a subcode block to the scanner;
comparing the data stored in the second register with the data of the third successive segment; setting a flag according to the result of the comparing step.

19. The method for evaluation of a subcode of a digital information transmission according to claim 13 further comprising
feeding the data of a selected segment of a subcode block to the scanner of a single period counter, where the single period counter counts the number of read in segments;
feeding the data of a successive segment of a subcode block to the scanner;
comparing the data stored in a first register with the data of the successive segment;
setting a flag according to the result of the comparing step;
comparing the data stored in the first register with the data of the third successive segment in case the data of the third successive segment are not congruent with the contents of the second register;
shifting the contents of the third successive segment into the first register in case the data of the third successive segment are not congruent with the contents of the first register; and
setting a flag according to the result of the comparing step.

* * * * *